(12) United States Patent
Elser et al.

(10) Patent No.: US 6,450,201 B1
(45) Date of Patent: Sep. 17, 2002

(54) MULTIWAY TURNING VALVE

(75) Inventors: Dieter Elser, Essingen; Falk Hofmann, Schwaebisch Hall, both of (DE)

(73) Assignee: ZF Lenksysteme GmbH, Schwabisch Gmund (DE)

( * ) Notice: Subject to any disclaimer, the term of this patent is extended or adjusted under 35 U.S.C. 154(b) by 0 days.

(21) Appl. No.: 09/786,018

(22) PCT Filed: Aug. 21, 1999

(86) PCT No.: PCT/EP99/06137
§ 371 (c)(1),
(2), (4) Date: Apr. 2, 2001

(87) PCT Pub. No.: WO00/12921
PCT Pub. Date: Mar. 9, 2000

(30) Foreign Application Priority Data

Aug. 29, 1998 (DE) .......................................... 198 39 427

(51) Int. Cl.$^7$ ............................................... E03B 1/00
(52) U.S. Cl. .............................. 137/625.65; 137/599.08; 137/601.14
(58) Field of Search ...................... 137/625.65, 599.08, 137/601.14

(56) References Cited

U.S. PATENT DOCUMENTS

| 2,935,086 | A | * | 5/1960 | Lehman et al. | ......... | 137/601.14 |
| 4,526,342 | A | * | 7/1985 | Wakefield | ............. | 137/625.65 |
| 4,819,695 | A | * | 4/1989 | Kervagoret | ............ | 137/625.65 |

FOREIGN PATENT DOCUMENTS

| DE | 803 573 | 4/1951 |
| DE | 1 005 794 | 1/1955 |
| DE | 1 675 426 | 12/1970 |
| DE | 30 13 535 | 9/1987 |
| DE | 41 16 705 | 11/1992 |
| DE | 41 17 734 | 2/1993 |
| DE | 195 27 412 | 1/1997 |
| DE | 195 41 752 | 5/1997 |
| DE | 196 29 217 | 1/1998 |
| EP | 0 102 443 | 3/1984 |
| EP | 0 145 546 | 1/1988 |

* cited by examiner

Primary Examiner—Henry C. Yuen
Assistant Examiner—John Bastianelli
(74) Attorney, Agent, or Firm—Kenyon & Kenyon

(57) ABSTRACT

A multiway rotary valve includes two valve elements for directing a pressurized medium to and from two working chambers of a servomotor and to a return connection for a pressurized-media vessel. The two valve elements can rotate relatively to each other. One valve element has a cavity, in which two planar control surfaces facing each other are disposed. The other valve element is a planar disk, which has two planar control surfaces facing away from each other. The planar control surfaces of the two valve elements have control openings that interact with each other. The inner valve element can be rotated by a limited angle by an actuator. The actuator, in the form of, for example, an impacting rod acts upon the valve element in a tangential direction. The valve element is designed as a semicircular disk, upon the radial contact surfaces of which the two impacting rods act, the two impacting rods being controllable by electromagnets.

13 Claims, 3 Drawing Sheets

MULTIWAY TURNING VALVE

FIELD OF THE INVENTION

The present invention relates to a multiway rotary valve.

BACKGROUND INFORMATION

The multiway rotary valve includes two valve elements, which interact to direct a pressurized medium to and from two working chambers of at least one servomotor, and to a return connection for a pressurized-media vessel. The two valve elements can rotate relative to each other. One of the two valve elements has a cavity, in which two planar control surfaces facing each other are disposed. The other of the two valve elements is essentially a planar disk, which has two planar control surfaces facing away from each other. The planar control surfaces of the two valve elements have control openings, which interact with each other.

For example, such a multiway rotary valve is described in European Published Patent Application No. 0 145 546. This multiway rotary valve is provided for a power-assisted steering system of a motor vehicle. In this case. A primary component is connected to an input-operation component. A secondary component is assigned to a primary component, via a free-travel connection. The free-travel connection allows a limited, relative movement of the primary and secondary components. Since the primary component is connected to a rotatable input component, the use of such a multiway rotary valve is limited to application, in which a rotatable input component is present, e.g., power-assisted steering systems in motor vehicles.

SUMMARY

It is an object of the present invention to provide a multiway rotary valve, which is not limited to use in power-assisted steering systems of motor vehicles. The multiway rotary valve is intended for general use as a control member in hydraulic systems.

The above and other beneficial objects of the present invention are achieved by providing a generic, multiway rotary valve, in which one of the two valve elements can be rotated by a limited amount, using at least one actuating element, the actuator acting upon the valve element in an essentially tangential direction. This design allows the multiway rotary valve to be used freely in various applications, for example, in a motor vehicle.

If the rotatable valve element has the shape of a circle segment, especially a semicircular shape having contact surfaces that are radially aligned, then an actuator may act upon one of the radial contact surfaces. Such an actuator may be in the form of an impacting rod, which may be controlled by an electromagnet. If two of such actuators are used, then the rotatable valve element may be adjusted and centered in both directions of rotation. When using the multiway rotary valve in a motor vehicle, the electromagnets may be energized as a function of at least one parameter. This allows different effects, such as steering angle, vehicle speed, vehicle load, etc., to be considered in controlling the multiway rotary valve.

Such a multiway rotary valve may easily be manufactured, when one of the two valve elements is made of two squeeze-molded, platelike, light-metal housing parts. The necessary control openings may also be pressed into these light-metal housing parts directly, during their manufacture. The other of the two valve elements, the rotatable one, may be formed as a punched, sheet-metal part, or a sintered part. The necessary control openings may be formed automatically during manufacture, e.g., by punching, stamping, or sintering. The two light-metal housing parts and the rotatable part are pivotally interconnected, such as, for example, by a centrally positioned bolt. This arrangement simplifies the assembly allows the planar clearance of the multiway rotary valve, between the control surfaces of the two valve elements, to be corrected in a simple manner. In addition, this arrangement may substantially prevent internal leakage of the multiway rotary valve.

To enlarge the multiway rotary valve, at least one more plate having an additional rotary valve or slide valve may be mounted to the multiway rotary valve. Thus additional functions, such as a hydraulic short-circuiting connection, may be integrated in the multiway rotary valve. An electromagnet for the actuators of the additional rotary valve or slide valve may also be provided.

DETAILED DESCRIPTION

Figure 1:
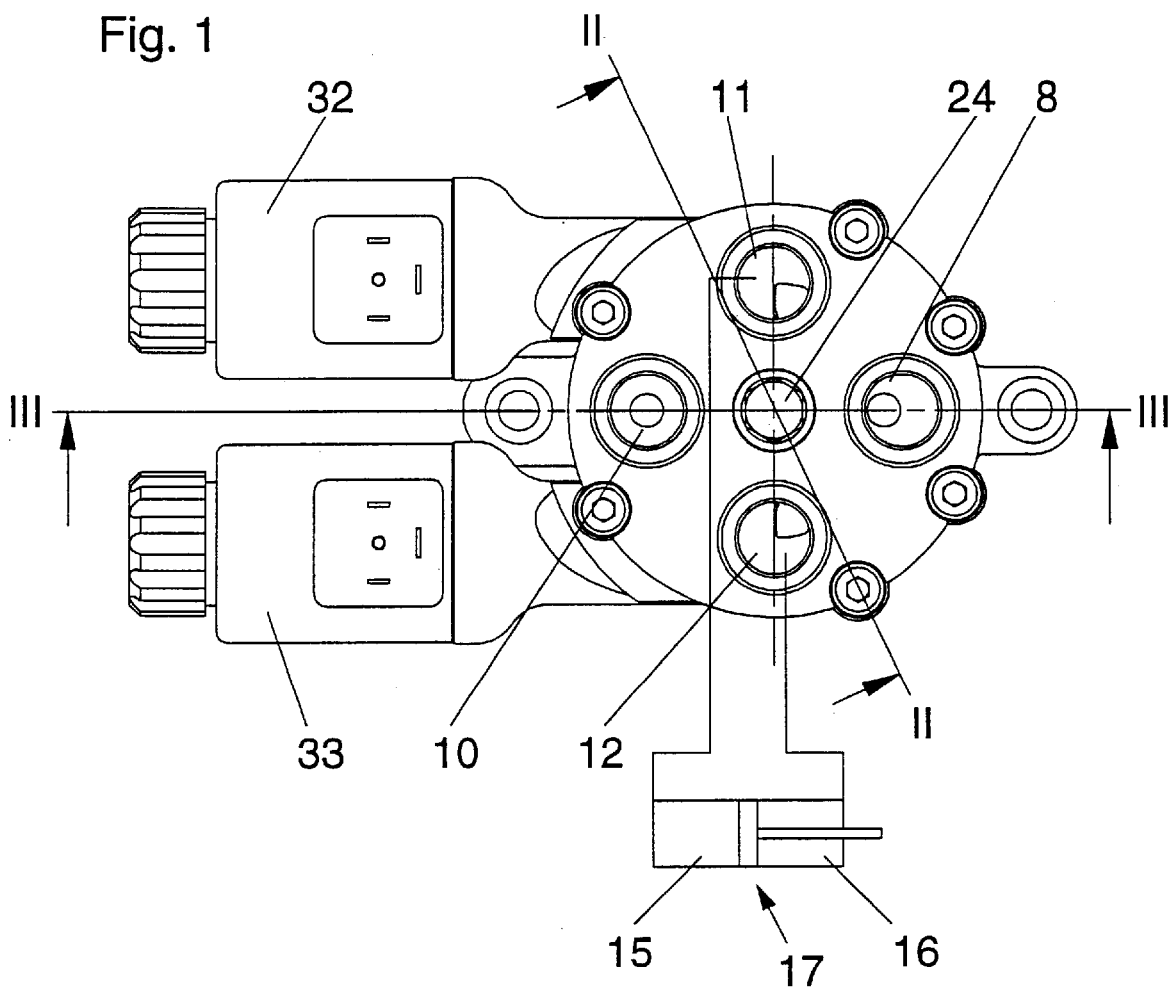
FIG. 1 is a plan view of a multiway rotary valve according to the present invention.
Figure 2:
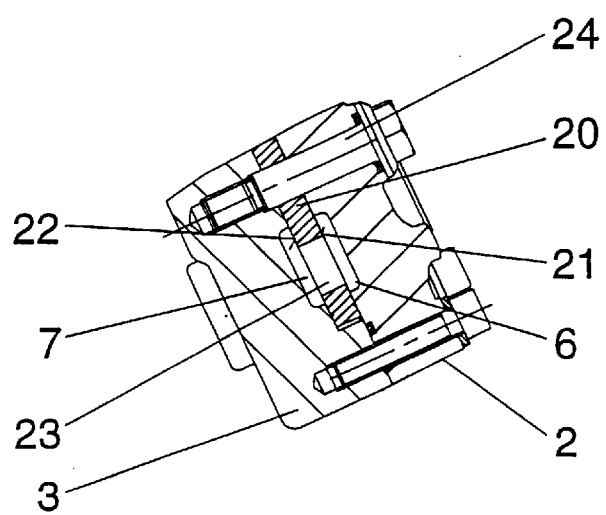
FIG. 2 is a partial cross-sectional view of the multiway rotary valve taken along the line II—II shown in FIG. 1.
Figure 3:
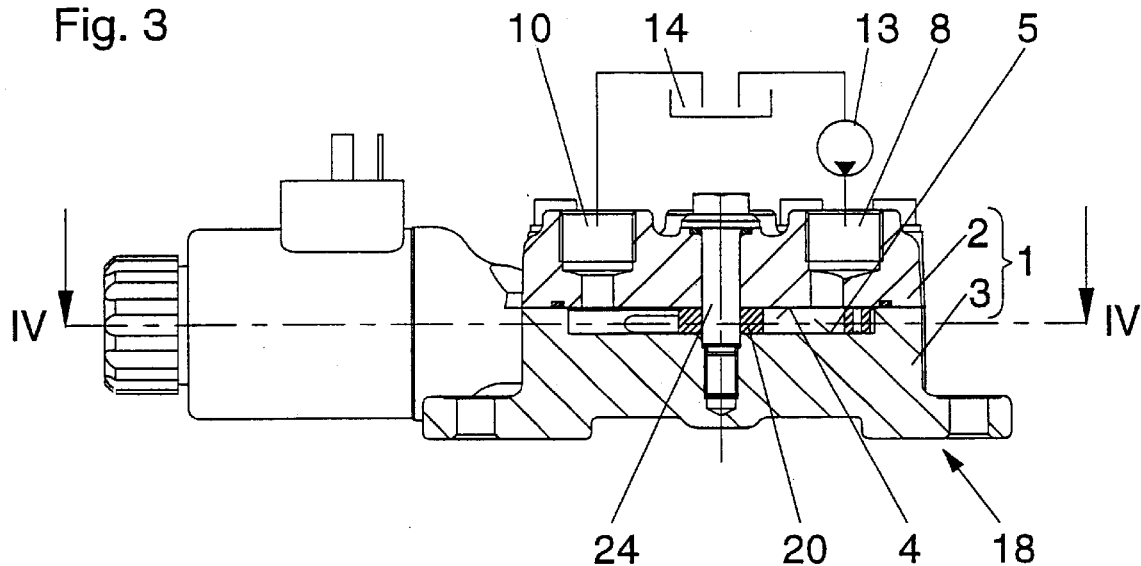
FIG. 3 is a cross-sectional view of the multiway rotary valve taken along the line III—III shown in FIG. 1.
Figure 4:
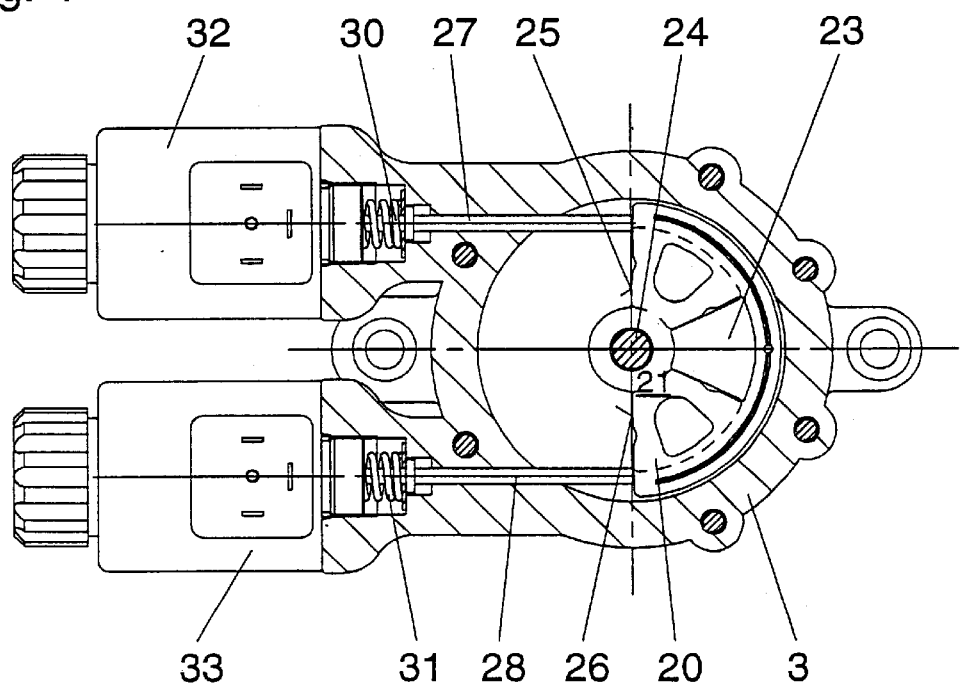
FIG. 4 is a cross-sectional view of the multiway rotary valve taken along the line IV—IV shown in FIG. 3.
Figure 5:
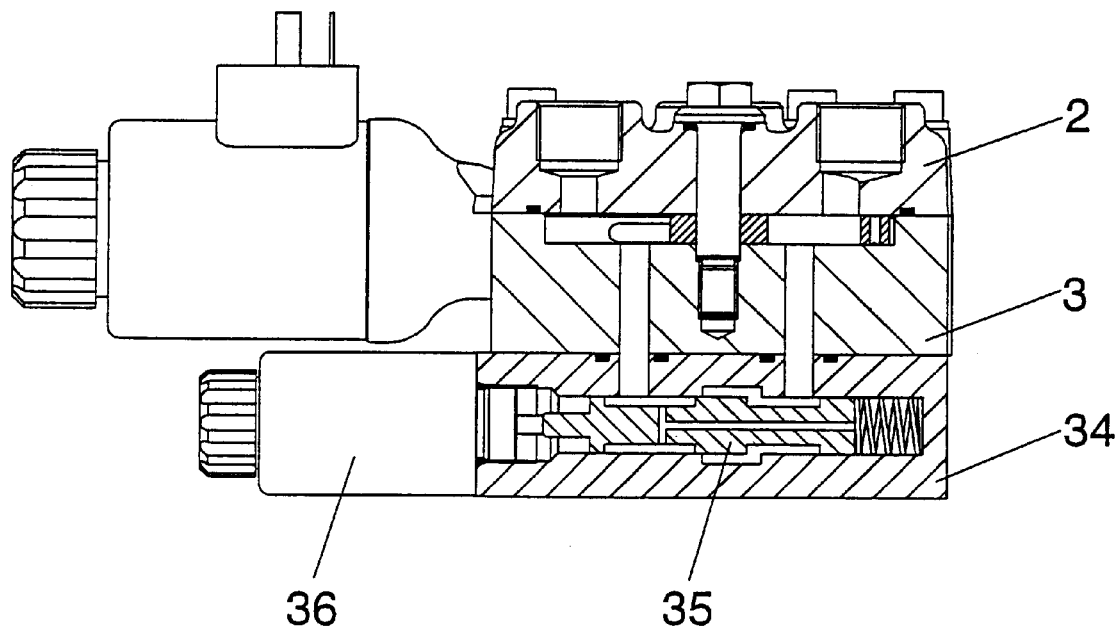
FIG. 5 is a cross-sectional view of a second example embodiment of the multiway rotary valve taken along the line II—II shown in FIG. 1.

The multiway rotary valve includes a valve housing 1, which includes two essentially platelike housing parts 2 and 3. The two housing parts 2 and 3 may be manufactured from light metal, such as aluminum, using a squeeze-molding method. Each of the two housing parts 2 and 3 has a planar control surface 4 and 5, respectively, into which control openings 6 and 7, respectively, are pressed during manufacture. The different control openings 6 of one housing part 2 are connected to an inlet connection 8, a return connection 10, and two cylinder connections 11 and 12. Inlet connection 8 is connected to a pressure-medium source, e.g., a servopump 13 or a pressure-medium reservoir, not shown. Return connection 10 is connected to a pressurized-media vessel 14. Cylinder connections 11 and 12 are connected to two working chambers 15 and 16 of a servomotor 17. Valve housing 1 is formed by a first valve element 18, which accommodates a second valve element 20 in a cavity formed between both control surfaces 4 and 5.

Second valve element 20 is made of an essentially planar disk, which may be manufactured as a punched, for example, sheet-metal part, or as a sintered part. Valve element 20 has two essentially planar control surfaces 21 and 22 facing away from each other. Control openings 23 may be formed in valve element 20 during its manufacture, e.g., by punching, stamping, or sintering.

The two housing parts 2 and 3 of first valve element 18 are connected to second valve element 20 by a central bolt 24. Bolt 24 acts simultaneously as the rotational axis for second valve element 20. Using bolt 24, the planar clearance of the multiway rotary valve, i.e., the clearance between control surfaces 4 and 5 of first valve element 18, and the clearance between control surfaces 21 and 22 of second valve element 20, may be adjusted in a fine and very precise manner.

Control openings 6 and 7 of first valve element 18 interact with control openings 23 of second valve element 20 to direct a pressurized medium from servopump 13 to and from both working chambers 15 and 16 of servomotor 17 and to return connection 10.

Second valve element 20 has a substantially semicircular shape including two radial contact surfaces 25 and 26. Two actuators in the form of impacting rods 27 and 28 act upon contact surfaces 25 and 26. Impacting rods 27 and 28 may be held in the neutral position by two springs 30 and 31, and the springs may be arranged to center second valve element 20 in its neutral position. The two impacting rods 27 and 28 are controlled by electromagnets 32 and 33. This arrangement allows valve element 20 to be rotated by a limited angle. If the multiway rotary valve is used in a motor vehicle, then the actuator may be controlled by electromagnets 32 and 33 as a function of the least one vehicle-specific parameter, e.g., the steering angle, the vehicle speed, or the load condition of the vehicle.

In order to integrate additional functions such as, e.g., a hydraulic short-circuiting connection into the multiway rotary valve, additional plates 34 may be attached to valve housing 1. An additional rotary valve or slide valve 35, which can be controlled by an additional electromagnet 36, may be arranged in such a plate 34.

What is claimed is:

1. A multiway rotary valve, comprising:
    a first valve element;
    a second valve element; and
    at least one actuator, the second valve element being rotatable by a limited angle by the at least one actuator acting on the second valve element in a substantially tangential direction;
    wherein the first and second valve elements interact to direct a pressurized medium to and from two working chambers of at least one servomotor and to a return connection for a pressurized-medium vessel;
    wherein the first and second valve elements are rotatable relative to each other;
    wherein the first valve element includes a cavity having two planar control surfaces facing each other;
    wherein the second valve element includes a substantially planar disk having two planar control surfaces facing away from each other; and
    wherein the planar control surfaces of the first and second valve elements include control openings that interact with each other.

2. The multiway rotary valve according to claim 1, wherein the second valve element has a shape of a circular segment and includes substantially radial contact surfaces, the at least one actuator acting on one of the substantially radial contact surfaces.

3. The multiway rotary valve according to claim 1, wherein the second valve element has a substantially semicircular shape.

4. The multiway rotary valve according to claim 2, wherein the second valve element has a substantially semicircular shape.

5. The multiway rotary valve according to claim 1, wherein at least one actuator includes an impacting rod controllable by an electromagnet.

6. The multiway rotary valve according to claim 2, wherein the multiway rotary valve includes two actuators acting on the radial contact surfaces, each actuator being controllable by an electromagnet.

7. The multiway rotary valve according to claim 1, wherein at least one of the first and second valve elements includes two squeeze-molded, platelike, light-metal housing parts having control openings pressed therein.

8. The multiway rotary valve according to claim 1, wherein at least one of the first and second valve elements includes a punched, sheet-metal part.

9. The multiway rotary valve according to claim 1, wherein at least one of the first and second valve elements includes a sintered part.

10. The multiway rotary valve according to claim 1, further comprising a centrally disposed bolt, a planar clearance between the first and second valve elements being adjustable by the bolt, the bolt defining a rotational axis of the second valve element.

11. The multiway rotary valve according to claim 1, further comprising at least one additional plate including one of a rotary valve and a slide valve, the at least one additional plate being mounted on the multiway rotary valve.

12. The multiway rotary valve according to claim 11, wherein the one of the rotary valve and the slide valve of the at least one additional plate is controllable by an electromagnet via an actuator.

13. The multiway rotary valve according to claim 1, wherein the at least one actuator is controllable by an electromagnet as a function of at least one vehicle-specific parameter of a motor vehicle.

* * * * *

UNITED STATES PATENT AND TRADEMARK OFFICE
CERTIFICATE OF CORRECTION

PATENT NO.    : 6,450,201 B1
DATED         : September 17, 2002
INVENTOR(S)   : Elser et al.

It is certified that error appears in the above-identified patent and that said Letters Patent is hereby corrected as shown below:

<u>Title page, Item [54] and Column 1, line 1,</u>
Change the title to -- MULTIWAY ROTARY VALVE --;

<u>Column 1,</u>
Line 29, change "application," to -- applications --;

<u>Column 2,</u>
Line 6, after "assembly" insert -- , --;
Line 54, change "manufactured as a punched, for example," to -- manufactured, for example, as a punched, --; and <u>Column 3,</u>
Line 7, after "two" insert -- substantially --.

Signed and Sealed this

Twentieth Day of May, 2003

JAMES E. ROGAN
*Director of the United States Patent and Trademark Office*